United States Patent
Efremkin et al.

(10) Patent No.: US 8,001,762 B2
(45) Date of Patent: Aug. 23, 2011

(54) METHOD AND DEVICE TO INCREASE THRUST AND EFFICIENCY OF JET ENGINE

(76) Inventors: Artem P. Efremkin, Ardsley, NY (US); Pavel V. Efremkin, Ardsley, NY (US)

( * ) Notice: Subject to any disclaimer, the term of this patent is extended or adjusted under 35 U.S.C. 154(b) by 1054 days.

(21) Appl. No.: 11/890,290

(22) Filed: Aug. 3, 2007

(65) Prior Publication Data
US 2008/0197212 A1   Aug. 21, 2008

Related U.S. Application Data

(60) Provisional application No. 60/835,472, filed on Aug. 4, 2006.

(51) Int. Cl.
*F02C 7/08* (2006.01)
(52) U.S. Cl. ............................................ 60/39.5; 60/770
(58) Field of Classification Search .................. 60/39.26, 60/39.3, 39.48, 39.53, 770, 771; 239/265.11, 239/265.17, 265.19, 265.23
See application file for complete search history.

(56) References Cited

U.S. PATENT DOCUMENTS

| | | | | |
|---|---|---|---|---|
| 3,020,714 A | * | 2/1962 | Eggers et al. | 239/265.23 |
| 3,288,373 A | * | 11/1966 | Pike | 239/265.23 |
| 3,442,350 A | * | 5/1969 | O'Brien | 181/221 |
| 3,641,766 A | * | 2/1972 | Uehling | 60/262 |
| 3,815,356 A | * | 6/1974 | Burge et al. | 60/204 |
| 6,112,513 A | * | 9/2000 | Catt et al. | 60/204 |
| 2003/0145577 A1 | * | 8/2003 | Hunter et al. | 60/231 |
| 2005/0214107 A1 | * | 9/2005 | Gutmark et al. | 415/1 |
| 2006/0283188 A1 | * | 12/2006 | Webster et al. | 60/770 |

* cited by examiner

*Primary Examiner* — Louis J. Casaregola
*Assistant Examiner* — Phutthiwat Wongwian
(74) *Attorney, Agent, or Firm* — Lawrence G. Fridman

(57) ABSTRACT

A method and device for adding special substances to the gaseous outflow of the jet engine in order to create a "virtual wall" of increased pressure zone behind the jet engine nozzle which can serve as a support for the jet engine gas outflow to push against, thus increasing the thrust power of the jet engine. This increase in acceleration power results in the accelerated movement of the jet engine equipped vehicle or higher fuel efficiency. A device that adds the special substances to the gaseous outflow is proposed. Characteristics of the special substances, which if added into the jet engine gaseous outflow may create a "virtual wall" of increased pressure zone behind the jet engine, are proposed.

11 Claims, 3 Drawing Sheets

METHOD AND DEVICE TO INCREASE THRUST AND EFFICIENCY OF JET ENGINE

This application claims the benefit of the provisional application 60/835,472 filed on Aug. 4, 2006.

BACKGROUND OF THE INVENTION

Previous Art

Jet engines are used in a variety of fields with military and civilian applications. These engines are used not only in planes, rockets and spacecraft, as they are able to propel vehicles at large speeds, but also on boats (surface boats and submarines) and wheeled vehicles. Jet engines create movement and increase the speed by pushing out a column of gasses (or water in water jet engines), which, in accordance with Newton's third law, pushes the vehicle forward in the opposite direction. The force that is created by the jet engine to overcome the vehicle's drag is called thrust.

A jet engine in its traditional version (See FIG. 1) consists of the following main units: an air inlet (1), compressor (2), fuel inlets (3), a combustion chamber (4), turbine (5), and nozzle (6). Incoming air flows in through an inlet (1) and compressor (2) then enters a combustion chamber (4). There it is mixed with fuel and ignited. Then it is forced out through the nozzle (6) in the form of a high-pressure hot column of gas (7) creating thrust. Other designs for a jet engine include turbo fan, ramjet and others. Acceleration, speed and fuel efficiency of a jet engine depend on its ability to generate thrust. In prior art there are known solutions to increase thrust based on optimal designs of internal parts of the jet engine such as an air inlet (1), compressor (2), fuel inlets (3), a combustion chamber (4), turbine (5), and nozzle (6).

There are also known solutions in which external structures are used to increase the jet engine thrust (acceleration). For example, to allow for a more efficient takeoff, aircraft carriers have retractable walls, which are put in place behind a jet engine when a jet plane takes off to allow the column of outflow gases to push against such a wall to create additional thrust and acceleration on top of the thrust of gaseous outflow, in accordance with Newton's third law. Additional thrust is produced because the hot gases that flow out from the engine are stopped by the wall and cannot easily dissipate into the surrounding atmosphere. Newly generated outflow gases push on the then not dissipated increased pressure zone from the previous jet engine outflow gases, thus creating the extra thrust. As a result, the plane is able to reach the appropriate speed faster. Proposed in this invention is a new method and device to increase the thrust power of the jet engine outflow by adding special substances into the jet engine out flow. Such a method can be applied to any of the above-discussed jet engines or any newly developed jet engines that have an outflow.

SUMMARY OF THE INVENTION

It is known that putting a real wall behind the jet engine will result in more thrust and better acceleration of the vehicle because the jet engine outflow gases can push against the wall. In this patent application, the creation of an increased high-pressure zone behind the engine nozzle is proposed. Such a high-pressure zone will serve as a "virtual wall" against which, the outflow gasses can push. To create such a high-pressure zone, also known as the "virtual wall", special substances will be added into the internal area of the jet engine and/or into the area behind the nozzle so that under influence of the special substances the area immediately behind the nozzle will become denser than it would without adding such substances. This will result in the creation of a "virtual wall" behind the jet engine nozzle, which will "travel" with the engine nozzle. By sending such special materials continuously into the outflow gasses, the "virtual wall" will continuously reproduce itself. It also may be beneficial to supply such special substances into the gaseous outflow in accordance with a certain, optimally chosen schedule, so that the "virtual wall" will be produced in time intervals, for example at take off or at other times of jet vehicle acceleration. The device to deliver such special substances is proposed to include all or some of the following elements (FIG. 2): 1) a member (8) which will produce or store such special substances (10) 2) substance delivery system (9) 3) inlets (inlet valves) (12) to deliver such substances into the interior areas of the jet engine which can be located at the any area of the jet engine: air inlet, and/or compressor or fan, and/or combustor (burner), and/or turbine (engine) and/or an exit nozzle as well as outside the nozzle opening area, 4) a valve (13) which optimally regulates flow of special substance (10) into the corresponding area of the jet engine. All or some of the above listed elements of the device to deliver special substances can be located outside or inside of the jet engine depending on its particular design. The special substance material used for the creation of such a "virtual wall" of increased pressure behind the nozzle may be gaseous (including but not limited to oxygen, water vapors etc.), liquid (including but not limited to water, alcohol, etc.), solid, organic, or non-organic but it should be able to increase its volume (or volume of devices made from such material in the gaseous outflow reaching the area behind the jet engine nozzle thus creating the "virtual wall" of increased pressure). One of the examples of possible materials (substances) to create such a "virtual wall" can be expandable plastic balls. Such balls would be made from expandable material and will be filled inside with expandable gaseous or liquid material. Under normal pressure such balls will have a sizeable volume. However, if put under high pressure they should be compressed into a very small size (10) which will allow for an easy flow of such balls through the jet engine valves and nozzle. When such compressed balls will exit the jet nozzle they will start to expand as the pressure of gaseous outflow will fall thus creating the "virtual wall" (11) which will provide additional support and thrust to new gaseous outflow. As an additional advantage, such balls should be made from biodegradable materials. So, in the illustration embodiment FIG. 2, the balls are held in a compressed state (10) in the storage tank (8) under a high pressure that is similar to or higher than the working pressure at the jet engine nozzle area. In this compressed state, the balls are added into gaseous outflow in the nozzle area (6) through a pipe (9) and inlet (12).

Another example of a possible expandable substance can be water. When added into the immediate vicinity of the jet engine nozzle outside the nozzle itself, water will expand because of high temperatures of the outflow gasses. This will result in the creation of an additional high-pressure zone which will serve as a "virtual wall" to push outflow gasses back, increasing the thrust. As shown on illustration FIG. 3, water can be delivered to the nozzle area from the storage tank (8) through pipes (9). Alternatively water, water vapors, or oxygen can also be delivered directly into the air inlet or other areas of the jet engine. The design of current airplanes can be easily adjusted to support water spraying into the engine gasses outflow areas by allocating part of airplane fuel tanks to store water. The increased efficiency of the thrust resulting from the addition of water into the outflow gasses will require less fuel for the airplane to travel the same distance, thus allowing it to use that freed fuel tank space to store water or other liquid or gaseous substances that can be used for the purposes of creating an increased pressure zone in the gaseous outflow area of the engine. Alternatively, a jet engine propelled vehicle can be equipped with a device which would collect condensing water from the atmosphere, therefore eliminating the need for a large storage tank of water. For the purposes of this application water may also be used in its solid state—ice.

DETAILED DESCRIPTION OF THE PREFERRED EMBODIMENTS

Although specific embodiments of the invention will now be described with reference to the drawings, it should be understood that the embodiments shown are by way of examples only and merely illustrative of but few of many possible specific embodiments which represent application of the principles of the invention. Various changes and modifications obvious to one skilled in the art to which the invention pertains are deemed to be within the spirit, scope and contemplation of the invention as further defined in appended claims.

Figure 1:
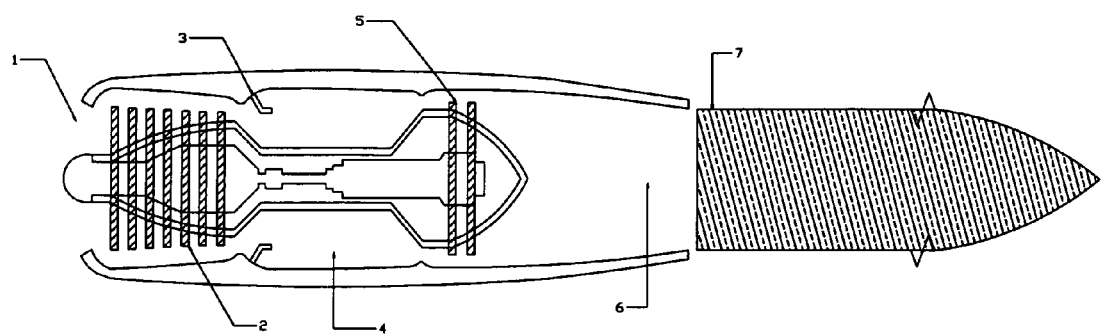
FIG. 1 shows a prior art jet engine consisting of the following main units: an inlet (1), compressor (2), fuel inlets (3), a combustion chamber (4), turbine (5), nozzle (6), and outflow gasses (7).
Figure 2:
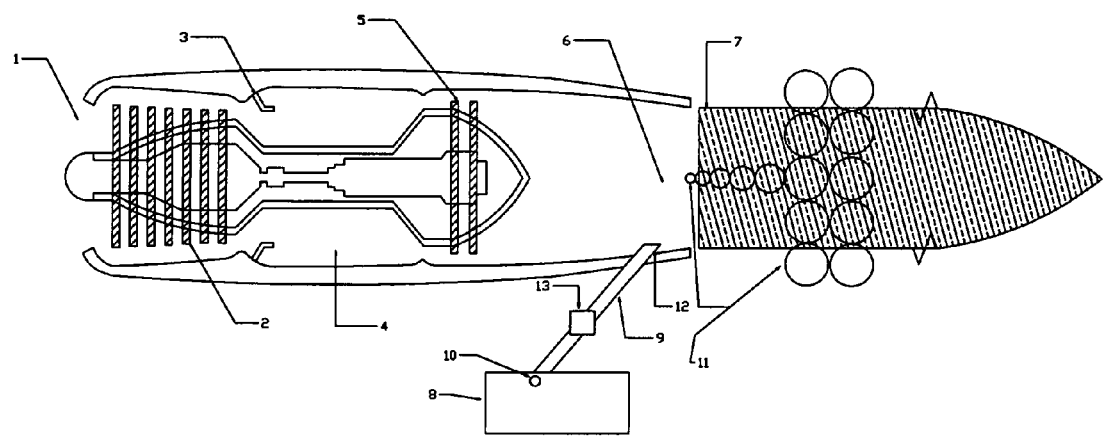
FIG. 2 shows a preferred embodiment jet engine consisting of the following units: an inlet (1), compressor (2), fuel inlets (3), a combustion chamber (4), turbine (5), and nozzle (6), outflow gasses (7), storage container for special substances (8), pipe to deliver special substances into nozzle area (9), special substances (10), "virtual wall" generated by special substances (11), inlets (12), a valve (13) which optimally regulates flow of special substance

First preferred embodiment is shown in FIG. 2. A jet engine equipped with the device that delivers special substance in the form of expandable plastic balls into the interior area of the jet engine to be mixed with the gaseous outflow. In addition to the traditional parts the jet engine, proposed in this invention includes, a pressurized storage container (8) filled with expandable plastic balls (10) with the pressure inside of the container to be similar to or greater than the pressure of gases in the nozzle (6) during operation, a pipe (9) to deliver expandable balls into nozzle area and a control valve (13) which optimally regulates flow of special substance (plastic balls) (10) into the corresponding area of the jet engine through the inlet (12). (Delivery of the balls to the other areas of the engine interior can also be considered). Because pressure in the storage container (8) and pipe (9) is similar to the pressure in the nozzle area, balls will keep the original size while being delivered into the nozzle area. When such compressed balls will exit the jet nozzle they will start to expand as the pressure of gaseous outflow outside of the nozzle will reduce. Such multiple expanded balls will create the "virtual wall" (11) which will provide additional support and thrust to the newly arriving gaseous outflow.

Figure 3:
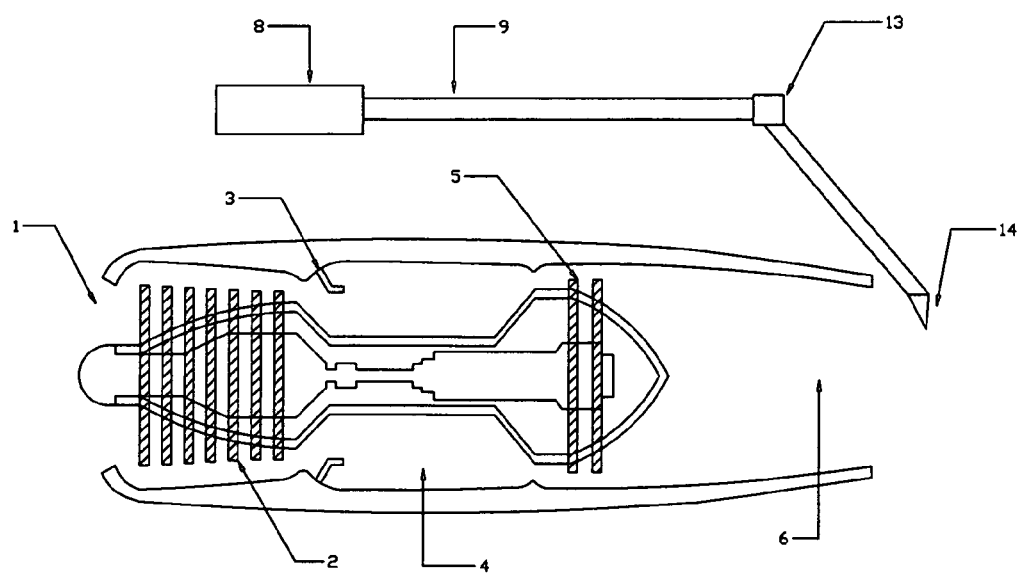
FIG. 3 shows a preferred embodiment jet engine consisting of the following units: an inlet (1), compressor (2), fuel inlets (3), a combustion chamber (4), turbine (5), and nozzle (6), pipe to deliver water or another liquid substance (9), container of substance (8), a valve (13) which optimally regulates flow of special substance, a special nozzle (14) to deliver substance in the optimum physical and geometrical form for maximum thrust creation

The second preferred embodiment shown on FIG. 3 schematically illustrates a possible configuration for the jet engine equipped with a device to add water or another liquid substance into the area behind the nozzle. Pipe unit (9) equipped with flow rate control valve (13) delivers water from the water storage tanks unit (8) into the nozzle area. By placing the pipe openings outside of the nozzle and in the direct path of the hot gaseous outflow, the delivered water will evaporate and create an extra high-pressure zone, which will serve as the "virtual wall". The end of the pipe (9) may be equipped with a special nozzle (14) to deliver liquid substance in the optimum physical and geometrical form for maximum thrust creation.

Figure 4:
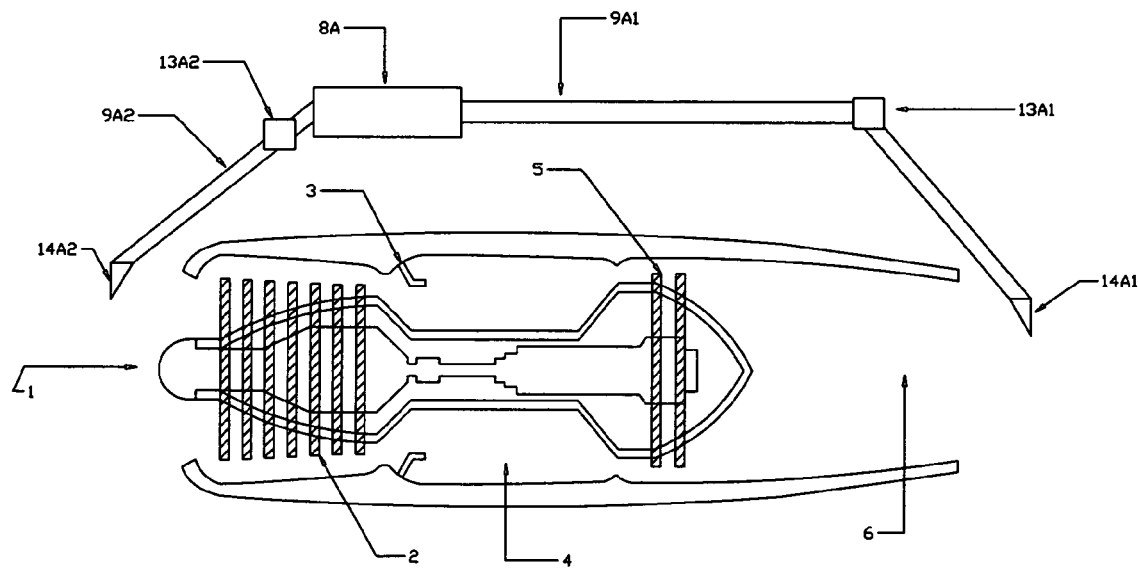
FIG. 4 shows a preferred embodiment jet engine consisting of the following units: an inlet (1), compressor (2), fuel inlets (3), a combustion chamber (4), turbine (5), and nozzle (6), pipe to deliver substance to the area behind the jet engine nozzle (9A1), pipe to deliver substance into the air inlet area of the jet engine (9A2), container of substance (8A), valve that will control the release of the substance behind the jet engine (13A1), valve that will control the release of the substance in front of the jet engine (13A2), special nozzle to release the substance behind the jet engine (14A1), special nozzle to release the substance into the air inlet area of the jet engine at optimum intervals and in optimal form (14A2).

The third preferred embodiment shown on FIG. 4 schematically illustrates an approach when special substance is added into multiple areas of the jet engine. In addition to the device to add water or another liquid into the area behind the nozzle through pipe unit (9A1) equipped with flow rate control valve (13A1) delivering water from the water storage tanks unit (8A) into the nozzle area, the second pipe 9A2 delivers water into the air inlet area. The rate of flow of water through pipes 9A1 and 9A2 should be chosen and constantly adapted by control valves 13A1 and 13A2 to maximize the jet engine thrust.

Figure 5:
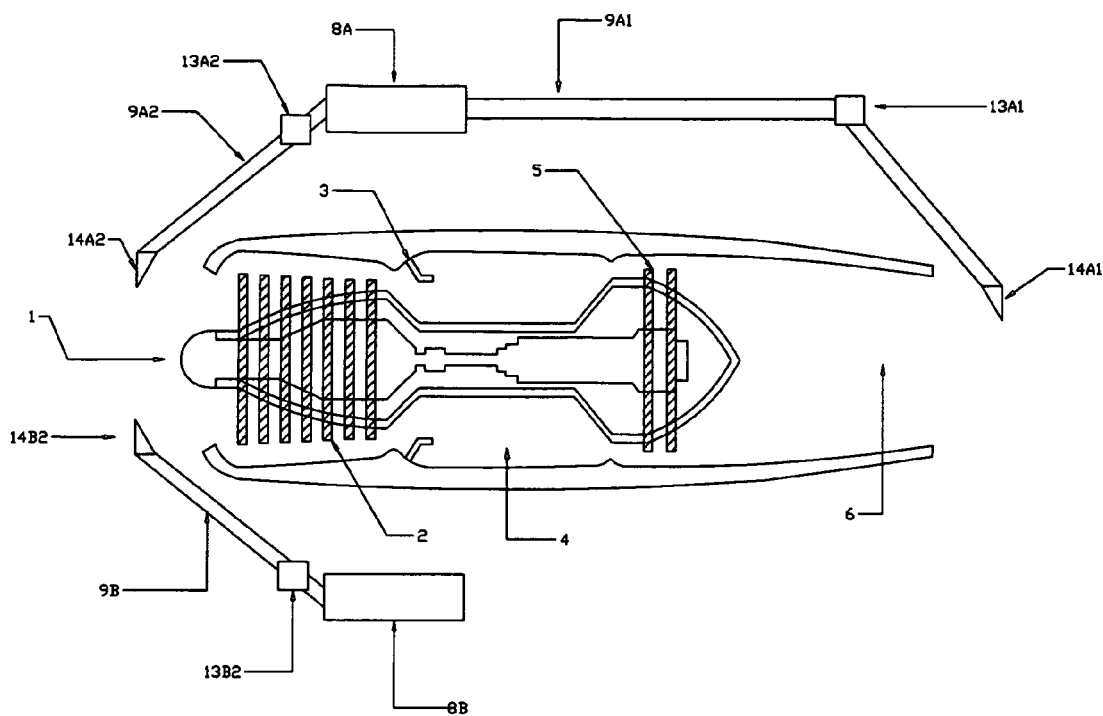
FIG. 5 shows a preferred embodiment jet engine consisting of the following units: an inlet (1), compressor (2), fuel inlets (3), a combustion chamber (4), turbine (5), and nozzle (6), pipe to deliver first substance to the area behind the jet engine nozzle (9A1), pipe to deliver first substance to the area in front of the jet engine (9A2), container of first substance (8A), valve that will control the release of the first substance behind the jet engine nozzle (13A1), valve that will control the release of the first substance into the air inlet area of the jet engine (13A2), special nozzle to release the substance behind the jet engine at optimum intervals and in optimal form (14A1), special nozzle to release the substance in front of the jet engine at optimum intervals and in optimal form (14A2), container of another substance (8B), valve that will control the release of the other substance into the air inlet area of the jet engine (13B2), special nozzle to release the other substance in front of the jet engine at optimum intervals and in optimal form (14B2)

The fourth preferred embodiment shown on FIG. 5 schematically illustrates an approach when multiple special substances are added into multiple areas of the jet engine. In this embodiment the second storage tank is proposed (8B) to store oxygen which is delivered to the air inlet area through pipe unit (9B) equipped with a flow rate control valve (13B) in order to further enhance the jet engine thrust and a special nozzle (14B).

What is claimed is:

1. A device for adding substances to a gaseous flow of a jet engine, the device comprising:
    a jet engine body forming an interior thereof extending between a jet inlet and a jet outlet discharging an exhaust gas flow;

a storage area that stores a multiplicity of breakable members containing an expandable fluid substance capable of being increased in volume;

a delivery system that delivers said members containing said fluid substance from the storage area to the jet engine outlet, so upon delivery and mixing with said exhaust gas flow said breakable members are broken releasing said fluid substance into the gaseous flow causing creation of an increased pressure zone behind the jet engine outlet.

2. The device according to claim 1, wherein said delivery system further comprises at least a rear nozzle associated with said jet engine outlet, said multiplicity of the breakable members is delivered from said storage area to said jet engine outlet through said rear nozzle.

3. The device according to claim 1, wherein said expandable fluid substance is a gaseous substance selected from the group including oxygen, hydrogen, and water vapors.

4. The device according to claim 1, wherein said expandable fluid substance is a liquid substance selected from the group including water and alcohol.

5. The device according to claim 1, wherein said breakable members have a ball-shaped configuration.

6. The device according to claim 1, wherein said expandable fluid substance is a combination of water and oxygen.

7. The device according to claim 1, further comprising a control valve that optimally regulates delivery of said members containing said expandable fluid substance.

8. The device according to claim 1, wherein breaking of said members and releasing said fluid substance causes creation of a virtual wall providing additional support and thrust to newly arriving gas flow at the jet engine outlet.

9. The device of claim 1, wherein said breakable members are made from biodegradable materials.

10. The device of claim 1, wherein said breakable members are held in a compressed state in the storage area having pressure that is similar to or higher than a working pressure at the jet engine outlet.

11. The device of claim 1, wherein said fluid substance is water in any physical state.

* * * * *